US012658818B2

(12) United States Patent
Wu et al.

(10) Patent No.: US 12,658,818 B2
(45) Date of Patent: Jun. 16, 2026

(54) HIGH ACCURACY POWER CONVERSION SYSTEM HAVING MULTIPLEX PIN AND CONTROL CIRCUIT AND METHOD THEREOF

(71) Applicant: Richtek Technology Corporation, Zhubei City (TW)

(72) Inventors: Hsin-Yi Wu, Hsinchu (TW); Chien-Fu Tang, Hsinchu (TW); Tzu-Chen Lin, Hsinchu (TW)

(73) Assignee: Richtek Technology Corporation, Zhubei City (TW)

( * ) Notice: Subject to any disclaimer, the term of this patent is extended or adjusted under 35 U.S.C. 154(b) by 184 days.

(21) Appl. No.: 18/790,197

(22) Filed: Jul. 31, 2024

(65) Prior Publication Data

US 2025/0379526 A1     Dec. 11, 2025

(30) Foreign Application Priority Data

Jun. 7, 2024    (TW) ................................. 113121296

(51) Int. Cl.
*H02M 7/217* (2006.01)
*H02M 1/32* (2007.01)

(52) U.S. Cl.
CPC ........... *H02M 7/217* (2013.01); *H02M 1/327* (2021.05)

(58) Field of Classification Search
CPC ............................. H02M 7/217; H02M 1/327
See application file for complete search history.

(56) References Cited

U.S. PATENT DOCUMENTS

| | | | | |
|---|---|---|---|---|
| 2018/0270913 A1* | 9/2018 | Bredemeier | ........... | H05B 6/062 |
| 2019/0013740 A1* | 1/2019 | Lin | ......................... | H02M 1/32 |
| 2020/0251983 A1* | 8/2020 | Peng | ....................... | H02M 1/32 |
| 2023/0067735 A1* | 3/2023 | Chen | ................... | H02M 1/4225 |
| 2023/0124433 A1* | 4/2023 | Yamane | ................. | H02M 1/32 |
| | | | | 363/21.12 |

* cited by examiner

*Primary Examiner* — Rafael O De Leon Domenech
(74) *Attorney, Agent, or Firm* — Tung & Associates

(57) ABSTRACT

A power conversion system includes: a rectifier for rectifying an AC input voltage to generate a rectified voltage; a power stage circuit coupled to the rectifier; a sensing circuit coupled between a multiplex pin and either the AC input voltage or the rectified voltage and configured to generate a multiplexed sensing signal; and a control circuit for performing operations for over-temperature protection and brown-out protection during respective over-temperature and brown-out protection periods based on the status of the multiplexed sensing signal. The control circuit includes: the multiplex pin; and a current source and a bias switch, serially coupled to the multiplex pin. During the over-temperature protection period, the bias switch is conductive to provide a bias current to the sensing circuit to generate a temperature sensing signal. Outside the over-temperature protection period, the bias switch is non-conductive to stop providing the bias current, thereby generating an input voltage sensing signal.

28 Claims, 13 Drawing Sheets

HIGH ACCURACY POWER CONVERSION SYSTEM HAVING MULTIPLEX PIN AND CONTROL CIRCUIT AND METHOD THEREOF

CROSS REFERENCE

The present invention claims priority to TW patent application No. 113121296, filed on Jun. 7, 2024.

BACKGROUND OF THE INVENTION

Field of Invention

The present invention relates to a power conversion system, particularly to a high-accuracy power conversion system with a multiplex pin. The present invention is capable of performing accurate over-temperature protection (OTP) and brown-out protection operations. The present invention also relates to a conversion control circuit and control method for a high-accuracy power conversion system.

Description of Related Art

FIG. 1 shows a prior art power conversion system. As shown in FIG. 1, a power conversion system 900 of the prior art is configured to convert an AC input voltage into an output voltage VO. A sensing current Isn in the control circuit flows through a pin TS, then through a diode Ds and a sensing resistor Rntc with a temperature coefficient, both outside the control circuit, to generate a sensing voltage signal Vsn, thereby sensing a live input terminal (having AC voltage VIL) or a neutral input terminal (having AC voltage VIN) of the AC input voltage and performing over-temperature protection operation through the same complex pin.

The drawbacks of the prior art includes that the temperature sensing circuit external to the control circuit requires the configuration of the diode Ds. When the temperature rises, the forward bias of the diode decreases, and the reverse leakage current of the diode increases. Therefore, the diode in the temperature: sensing circuit affects the accuracy of temperature sensing, thereby impacting the accuracy of the over-temperature protection operation and the brown-out protection operation.

In view of the above drawbacks of the prior art, the present invention provides a high-accuracy power conversion system with a multiplex pin. Compared to the prior art, the power conversion system of the present invention does not require a diode or can compensate the error caused by the diode, thus improving the accuracy of temperature sensing. This enhancement increases the accuracy of the over-temperature protection operation and the brown-out protection operation, avoiding or mitigating the non-ideal effects caused by the diode.

SUMMARY OF THE INVENTION

From one perspective, the present invention provides a power conversion system, configured to convert an AC input voltage into an output voltage, comprising: a rectifier, configured to rectify the AC input voltage to generate a rectified voltage; a power stage circuit, coupled to the rectifier, including at least one switch and an inductor; a sensing circuit, including a temperature-sensitive element, wherein the sensing circuit is coupled to the AC input voltage or the rectified voltage and configured to generate a multiplexed sensing signal; and a conversion control circuit, configured to perform an over temperature protection (OTP) operation during an over temperature protection period and to perform a brown-out protection operation during a brown-out protection period, based on the status of the multiplexed sensing signal, wherein the conversion control circuit includes: a multiplex pin, coupled to the multiplexed sensing signal, wherein the multiplexed sensing signal corresponds to a temperature sensing signal during the over temperature protection period and corresponds to an input voltage sensing signal outside the over temperature protection period; and a current source and a bias switch, serially coupled to the multiplex pin; wherein during the over temperature protection period, the bias switch is conductive to control the current source to provide a bias current to the sensing circuit through the multiplex pin, thereby the sensing circuit generating the temperature sensing signal at the multiplex pin, and when the temperature sensing signal exceeds a temperature sensing threshold, the conversion control circuit indicates that a tested temperature is above a predetermined temperature threshold; wherein outside the over temperature protection period, the bias switch is non-conductive to stop the provision of the bias current through the multiplex pin, thereby the sensing circuit generating the input voltage sensing signal at the multiplex pin; wherein during the brown-out protection period, when the input voltage sensing signal is below a brown-out sensing threshold, the conversion control circuit indicates that the AC input voltage is below a predetermined brown-out threshold.

In one embodiment, the sensing circuit further includes a voltage divider, configured to generate a divided voltage based on the AC input voltage or the rectified voltage; wherein the temperature-sensitive element is coupled between the divided voltage and the multiplex pin to generate the multiplexed sensing signal at the multiplex pin; wherein during the over temperature protection period, the bias current flows through the temperature-sensitive element and the voltage divider to generate the temperature sensing signal; wherein outside the over temperature protection period, the divided voltage of the voltage divider corresponds to the input voltage sensing signal.

In one embodiment, the rectifier is configured as a half-wave rectifier to half-wave rectify the AC input voltage to generate the rectified voltage; wherein the over temperature protection period is related to a zero-voltage period of the rectified voltage, during which the rectified voltage is zero.

In one embodiment, the brown-out protection period is related to a positive voltage period of the rectified voltage, during which the rectified voltage is greater than zero, and during the brown-out protection period, the rectified voltage has a peak voltage.

In one embodiment, the rectifier is configured as a half-wave rectifier or a full-wave rectifier to half-wave rectify or full-wave rectify the AC input voltage to generate the rectified voltage; wherein the conversion control circuit further samples and holds a peak value of the multiplexed sensing signal at a peak time point during the brown-out protection period.

In one embodiment, the conversion control circuit further samples and holds a first voltage value of the multiplexed sensing signal at a first determination time point during a positive voltage period of the rectified voltage, during which the rectified voltage is greater than zero, and samples and holds a second voltage value of the multiplexed sensing signal at a second determination time point during another positive voltage period of the rectified voltage, wherein a phase corresponding to the first determination time point relative to the positive voltage period has the same phase relationship as a phase corresponding to the second determination time point relative to the another positive voltage period; wherein when a difference between the first voltage value and the second voltage value is less than a threshold, the over temperature protection operation is performed during the over temperature protection period, and when the difference between the first voltage value and the second voltage value is greater than the threshold, the over temperature protection operation is skipped during the over temperature protection period; wherein the first determination time point is related to the brown-out protection period, and the second determination time point is related to the over temperature protection period.

In one embodiment, the temperature sensing threshold includes a peak value of the temperature sensing signal.

In one embodiment, the conversion control circuit further includes: a comparator, configured to compare the AC input voltage or the rectified voltage with a reference voltage to generate a comparison result; and a counter, configured to count according to the comparison result, starting to count when the comparison result turns to a first level, and stopping counting when the comparison result turns to a second level, thereby determining the peak time point during the brown-out protection period.

In one embodiment, outside the over temperature protection period, the conversion control circuit is further configured to perform a brown-in control, wherein when the input voltage sensing signal is above a brown-in sensing threshold, the conversion control circuit indicates that the AC input voltage is above a predetermined brown-in threshold, wherein the brown-in sensing threshold is higher than the brown-out sensing threshold.

In one embodiment, the voltage divider includes: a first resistor, coupled between the AC input voltage or the rectified voltage and the temperature-sensitive element; a second resistor, coupled between the temperature-sensitive element and a ground potential; and a plurality of diodes, serially coupled between the temperature-sensitive element and the ground potential; wherein the over temperature protection period corresponds to the zero-voltage period of the rectified voltage; wherein during the over temperature protection period, the bias current flows through the temperature-sensitive element and the plurality of diodes to generate the temperature sensing signal, wherein an equivalent resistance of the plurality of diodes when conductive is much smaller than an equivalent resistance of the first resistor, the second resistor, or the temperature-sensitive element; wherein during the brown-out protection period, the plurality of diodes are non-conductive.

In one embodiment, the voltage divider includes: a first resistor, coupled between the AC input voltage or the rectified voltage and the temperature-sensitive element; a second resistor, coupled between the temperature-sensitive element and a ground potential; and a diode and a third resistor, coupled in parallel to the first resistor; wherein the over temperature protection period corresponds to the zero-voltage period of the rectified voltage; wherein during the over temperature protection period, the bias current flows through the temperature-sensitive element and the diode and the third resistor to generate the temperature sensing signal, wherein when the tested temperature is close to but not exceeding the predetermined temperature threshold, a difference between a resistance value of the third resistor and an equivalent resistance value of the temperature-sensitive element is small enough to ensure that a voltage across the temperature-sensitive element is large enough, such that a temperature measurement error is less than a predetermined error range; wherein during the brown-out protection period, the diode is non-conductive.

In one embodiment, during a first period of the over temperature protection period, the bias current has a first current value, thereby generating a first temperature sensing voltage at the multiplex pin, and during a second period of the over temperature protection period, the bias current has a second current value, thereby generating a second temperature sensing voltage at the multiplex pin; wherein a voltage across the temperature-sensitive element is obtained with a voltage offset of the diode being eliminated, based on the first current value, the first temperature sensing voltage, the second current value, and the second temperature sensing voltage thereby achieving the over temperature protection operation.

From another perspective, the present invention provides a conversion control circuit for controlling a power conversion system, wherein the power conversion system is configured to convert an AC input voltage into an output voltage, wherein the power conversion system includes a rectifier, a power stage circuit, and a sensing circuit, wherein the rectifier is configured to rectify the AC input voltage to generate a rectified voltage, wherein the power stage circuit is coupled to the rectifier and includes at least one switch and an inductor, wherein the sensing circuit includes a temperature-sensitive element, and is coupled to the AC input voltage or the rectified voltage to generate a multiplexed sensing signal; the conversion control circuit being configured to perform an over temperature protection (OTP) operation during an over temperature protection period and to perform a brown-out protection operation during a brown-out protection period, based on the status of the multiplexed sensing signal, wherein the conversion control circuit comprises: a multiplex pin, coupled to the multiplexed sensing signal, wherein the multiplexed sensing signal corresponds to a temperature sensing signal during the over temperature protection period, and corresponds to an input voltage sensing signal outside the over temperature protection period; and a current source and a bias switch, serially coupled to the multiplex pin; wherein during the over temperature protection period, the bias switch is conductive to control the current source to provide a bias current to the sensing circuit through the multiplex pin, thereby the sensing circuit generating the temperature sensing signal at the multiplex pin, and when the temperature sensing signal exceeds a temperature sensing threshold, the conversion control circuit indicates that a tested temperature is above a predetermined temperature threshold; wherein outside the over temperature protection period, the bias switch is non-conductive to stop the provision of the bias current through the multiplex pin, thereby the sensing circuit generating the input voltage sensing signal at the multiplex pin; wherein during the brown-out protection period, when the input voltage sensing signal is below a brown-out sensing threshold, the conversion control circuit indicates that the AC input voltage is below a predetermined brown-out threshold.

From another perspective, the present invention provides a control method for controlling a power conversion system, wherein the power conversion system is configured to convert an AC input voltage into an output voltage, wherein the power conversion system includes a rectifier, a power stage circuit, and a sensing circuit, wherein the rectifier is configured to rectify the AC input voltage to generate a rectified voltage, wherein the power stage circuit is coupled to the rectifier and includes at least one switch and an inductor, wherein the sensing circuit includes a temperature-sensitive element and is coupled to the AC input voltage or the rectified voltage to generate a multiplexed sensing signal; the control method comprising: controlling the power conversion system to perform an over temperature protection (OTP) operation during an over temperature protection period and to perform a brown-out protection operation during a brown-out protection period, based on the status of the multiplexed sensing signal; receiving the multiplexed sensing signal at a multiplex pin of a conversion control circuit configured to control the power conversion system, wherein the multiplexed sensing signal corresponds to a temperature sensing signal during the over temperature protection period, and corresponds to an input voltage sensing signal outside the over temperature protection period; providing a bias current to the sensing circuit through the multiplex pin during the over temperature protection period, thereby generating the temperature sensing signal at the multiplex pin, wherein when the temperature sensing signal exceeds a temperature sensing threshold, indicating that a tested temperature is above a predetermined temperature threshold; stopping the provision of the bias current through the multiplex pin outside the over temperature protection period, thereby generating the input voltage sensing signal at the multiplex pin; and during the brown-out protection period, when the input voltage sensing signal is below a brown-out sensing threshold, the conversion control circuit indicates that the AC input voltage is below a predetermined brown-out threshold.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
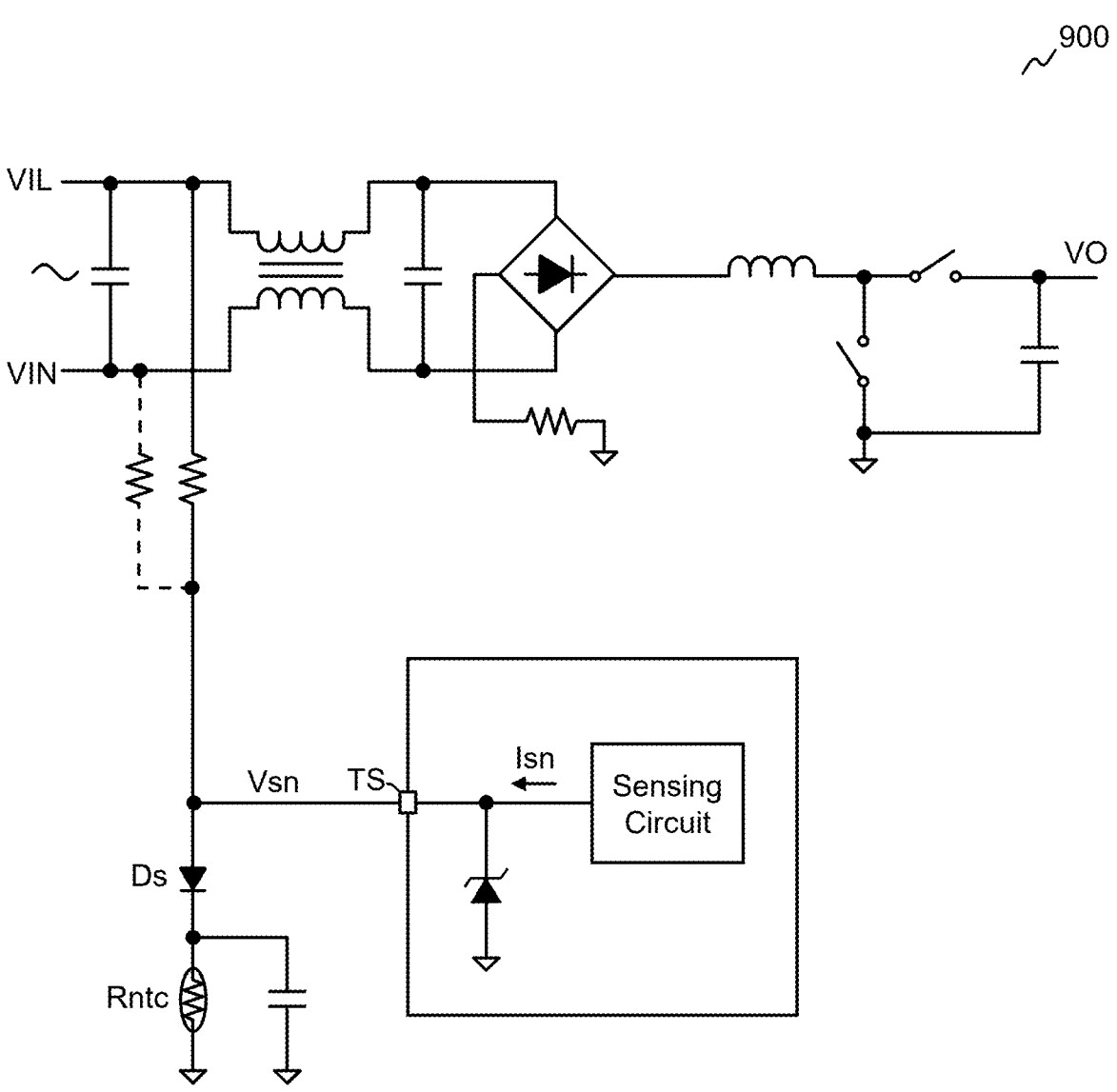
FIG. 1 shows a prior art power conversion system.
Figure 2A:
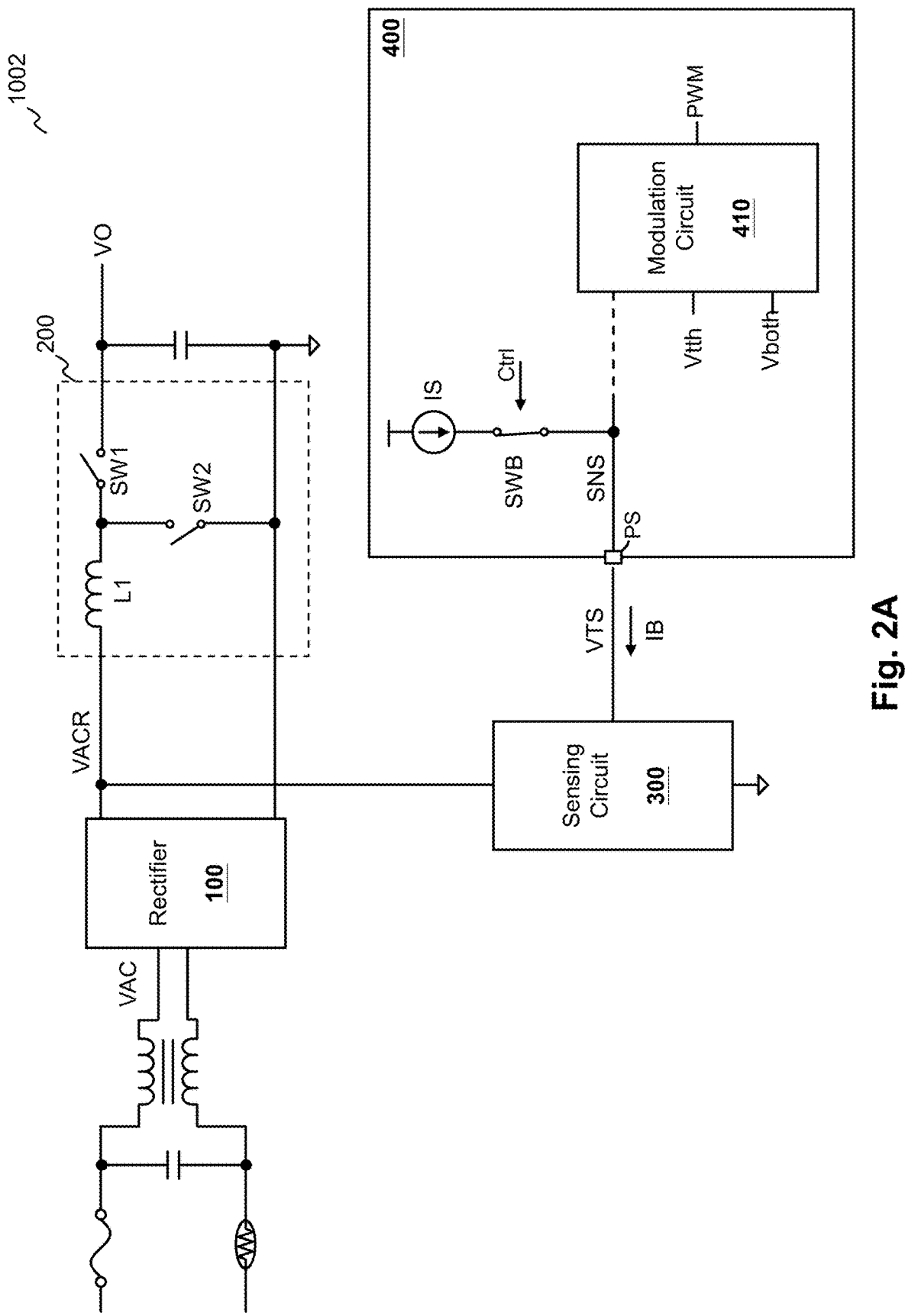
FIGS. 2A and 2B show block diagrams of the power conversion system operating in different operating periods according to an embodiment of the present invention.
Figure 2B:
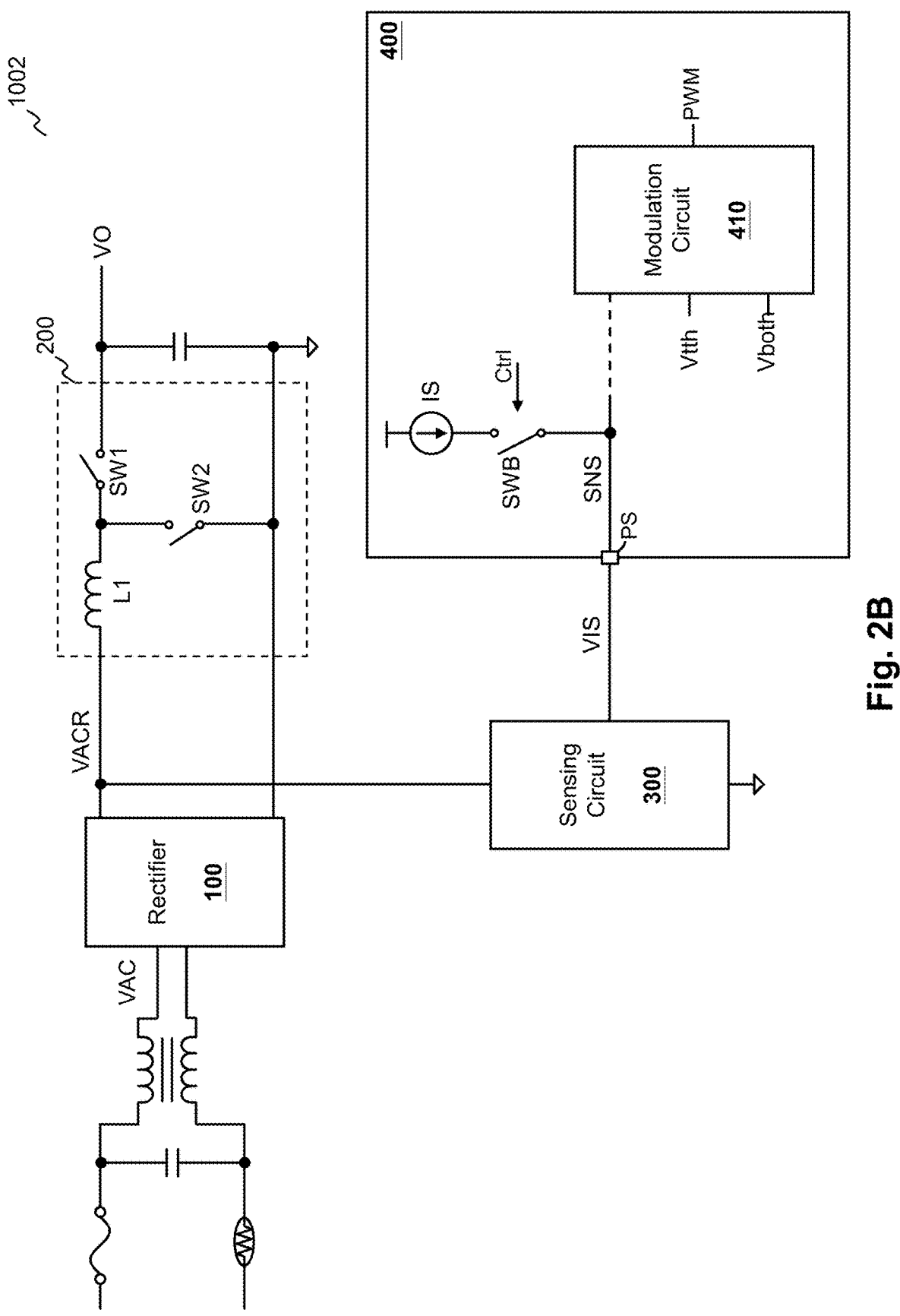

FIGS. 2A and 2B show block diagrams of the power conversion system operating in different operating periods according to an embodiment of the present invention. In one embodiment, a power conversion system 1002 is configured to convert an AC input voltage VAC to generate an output voltage VO. In this embodiment, the power conversion system 1002 comprises a rectifier 100, a power stage circuit 200, a sensing circuit 300, and a conversion control circuit 400. In one embodiment, the rectifier 100 is configured to rectify the AC input voltage VAC to generate a rectified voltage VACR. The power stage circuit 200 is coupled to the rectifier 100 and includes at least one switch and an inductor. In this embodiment, the power stage circuit 200 includes switches SW1 and SW2, and an inductor L1. The switches SW1 and SW2 are configured to switch the inductor L1 according to a pulse-width modulation (PWM) signal. In one embodiment, as shown in FIGS. 2A and 2B, the sensing circuit 300 is coupled between a multiplex pin PS and the rectified voltage VACR to sense the rectified voltage VACR, to generate a multiplexed sensing signal SNS.

In one embodiment, the conversion control circuit 400 includes the multiplex pin PS, a current source IS, and a bias switch SWB. In one embodiment, the multiplex pin PS is coupled to the multiplexed sensing signal SNS. The current source IS and the bias switch SWB are serially coupled to the multiplex pin PS. In one embodiment, the conversion control circuit 400 is configured to perform an over-temperature protection (OTP) operation during an over-temperature protection period and to perform a brown-out protection operation during a brown-out protection period, based on the status of the multiplexed sensing signal SNS. In this embodiment, the modulation circuit 410 in the conversion control circuit 400 is configured to generate a PWM signal based on the multiplexed sensing signal SNS, a temperature sensing threshold Vtth, and a brown-out sensing threshold Vboth to control the switching of the switches SW1 and SW2.

FIG. 2A shows a schematic diagram of the conversion control circuit 400 operating during the over-temperature protection period. As shown in FIG. 2A, in one embodiment, during the over-temperature protection period, a control signal Ctrl controls the bias switch SWB to be conductive, thereby controlling the current source IS to provide a bias current IB to the sensing circuit 300 through the multiplex pin PS, thereby the sensing circuit 300 generating a temperature sensing signal VIS at the multiplex pin PS. In one embodiment, when the temperature sensing signal VTS exceeds a temperature sensing threshold Vtth, the conversion control circuit 400 indicates that the tested temperature is above a predetermined temperature threshold. In this case, an over-temperature protection operation will be performed accordingly.

FIG. 2B shows a schematic diagram of the conversion control circuit 400 operating during the brown-out protection period. As shown in FIG. 2B, in one embodiment, outside the over-temperature protection period, the control signal Ctrl controls the bias switch SWB to be non-conductive, thereby stopping the provision of the bias current IB through the multiplex pin PS and enabling the sensing circuit 300 to generate an input voltage sensing signal VIS at the multiplex pin PS. In one embodiment, when the input voltage sensing signal VIS is below the brown-out sensing threshold Vboth, the conversion control circuit 400 indicates that the AC input voltage VAC is below the predetermined brown-out threshold, an brown-out protection operation will be performed accordingly.

It should be noted that, in the above embodiment, the bias switch SWB is only conductive during the over-temperature protection period and is non-conductive during other periods outside the over-temperature protection period. The multiplexed sensing signal SNS corresponds to the temperature sensing signal VTS during the over-temperature protection period and corresponds to the input voltage sensing signal VIS outside the over-temperature protection period.

Figure 3:
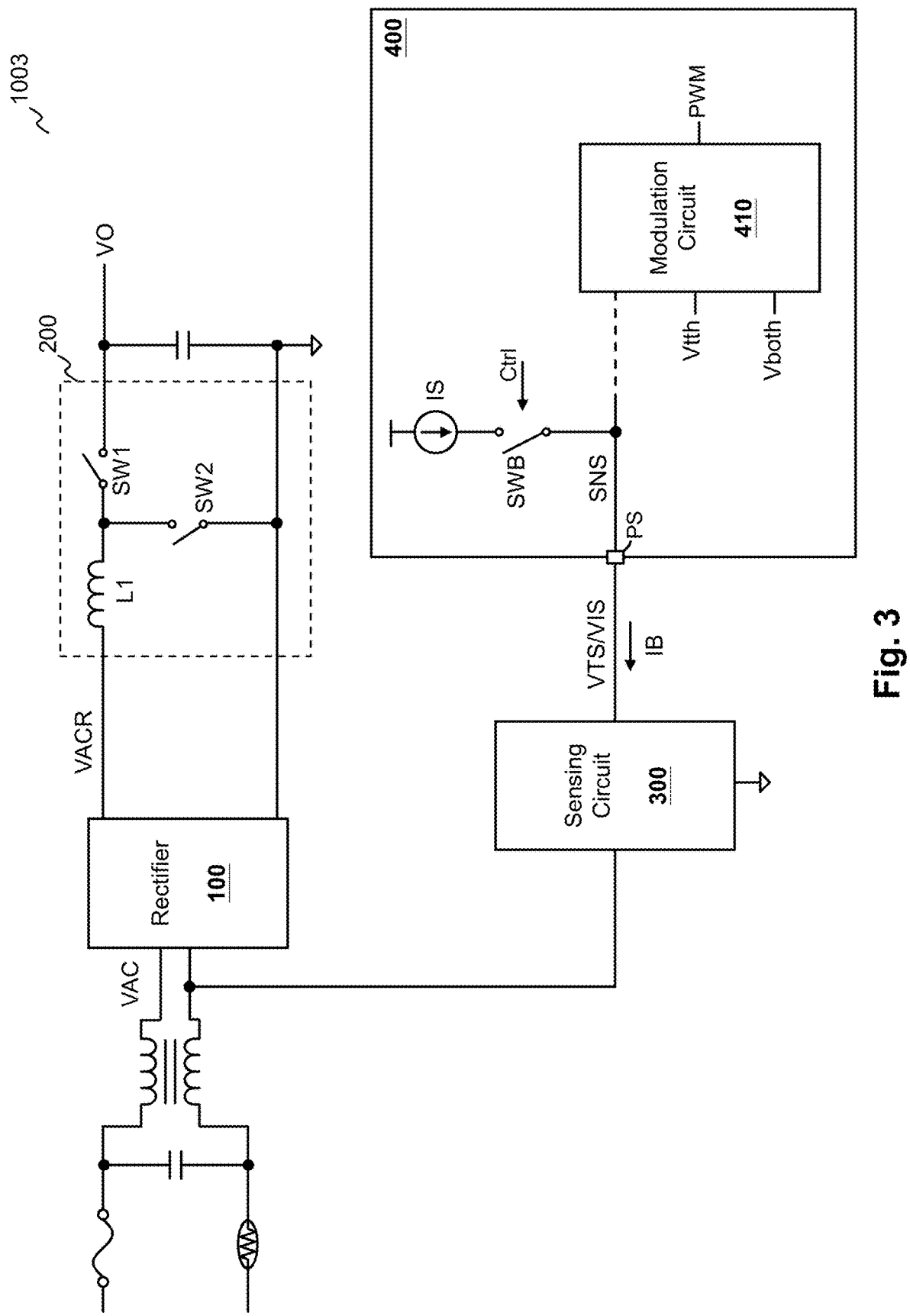
FIG. 3 shows a block diagram of the power conversion system according to an embodiment of the present invention.

FIG. 3 shows a block diagram of the power conversion system according to an embodiment of the present invention. The difference between the power conversion system 1003 in FIG. 3 and the power conversion system 1002 in FIG. 2A or FIG. 2B is that, in one embodiment, as shown in FIG. 3, the sensing circuit 300 is coupled between the multiplex pin PS and the AC input voltage VAC to sense the AC input voltage VAC and generate the multiplexed sensing signal SNS. The following description will use the specific embodiments of FIGS. 2A and 2B as examples. Those skilled in the art can deduce the operation of the embodiment in FIG. 3 from the following description.

Figure 4:
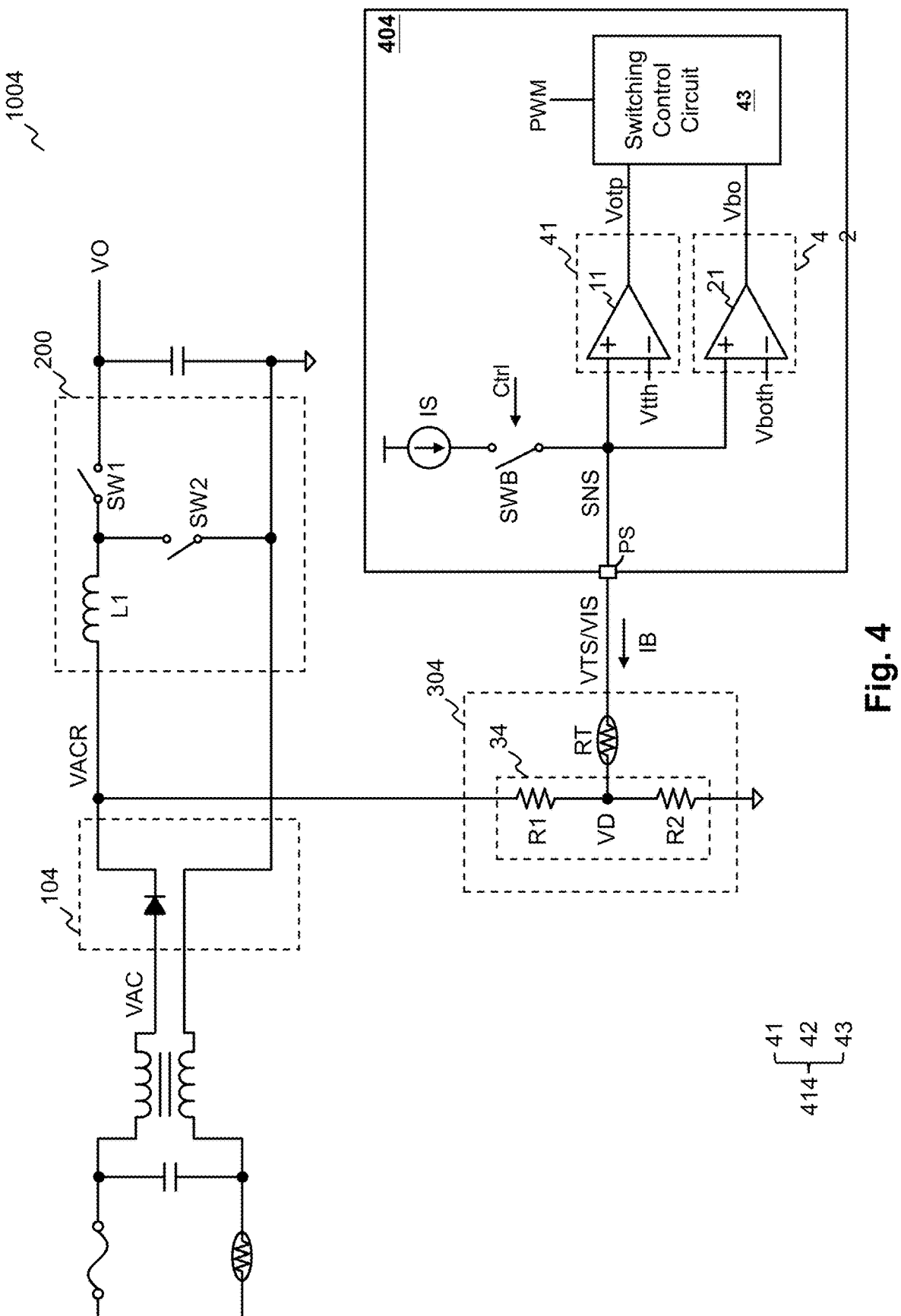
FIG. 4 shows a schematic diagram of a power conversion system according to a specific embodiment of the present invention.

FIG. 4 shows a schematic diagram of a power conversion system according to a specific embodiment of the present invention. The power conversion system 1004 in FIG. 4 is a specific embodiment corresponds to FIGS. 2A and 2B. In one embodiment, as shown in FIG. 4, the rectifier 104 is configured as a half-wave rectifier, including one diode, for half-wave rectifying the AC input voltage VAC to generate the rectified voltage VACR. In one embodiment, the sensing circuit 304 includes a temperature-sensitive element RT and a voltage divider 34. In this embodiment, the voltage divider 34 includes resistors R1 and R2 to generate a divided voltage VD based on the rectified voltage VACR. In this embodiment, the temperature-sensitive element RT, which has a negative temperature coefficient, is coupled between the divided voltage VD and the multiplex pin PS to generate the multiplexed sensing signal SNS at the multiplex pin PS. In one embodiment, during the over-temperature protection period, the bias switch SWB is conductive, allowing the bias current IB to flow through the temperature-sensitive element RT and the voltage divider 34, thereby generating the temperature sensing signal VTS. In one embodiment, outside the over-temperature protection period, the bias switch SWB is non-conductive, and no current flows through the temperature-sensitive element RT, such that the divided voltage VD of the voltage divider 34 corresponds to the input voltage sensing signal VIS.

In one embodiment, as shown in the conversion control circuit 404 in FIG. 4, the modulation circuit 414 includes an over-temperature protection circuit 41, a brown-out protection circuit 42, and a switching control circuit 43. In this embodiment, the over-temperature protection circuit 41 includes a comparator 11, and the brown-out protection circuit 42 includes a comparator 21. In one embodiment, during the over-temperature protection period, the comparator 11 is configured to compare the multiplexed sensing signal SNS (corresponding to the temperature sensing signal VTS during this period) with the temperature sensing threshold Vtth to generate the over-temperature protection signal Votp. The over-temperature protection signal Votp is configured to indicate that the tested temperature is above the predetermined temperature threshold when the temperature sensing signal VTS exceeds the temperature sensing threshold Vtth, such that the switching control circuit 43 performs the over-temperature protection operation. In one embodiment, during the brown-out protection period, the comparator 21 is configured to compare the multiplexed sensing signal SNS (corresponding to the input voltage sensing signal VIS during this period) with the brown-out sensing threshold Vboth to generate the brown-out protection signal Vbo. The brown-out protection signal Vbo is configured to indicate that the AC input voltage VAC is below the predetermined brown-out threshold when the input voltage sensing signal VIS is below the brown-out sensing threshold Vboth, such that the switching control circuit 43 performs the brown-out protection operation. In one embodiment, the temperature-sensitive element RT is an NTC, having a negative temperature coefficient. In this case, when the temperature sensing signal VTS is lower than the temperature sensing threshold Vtth, it indicates that the tested temperature is above the predetermined temperature threshold.

Figure 5:
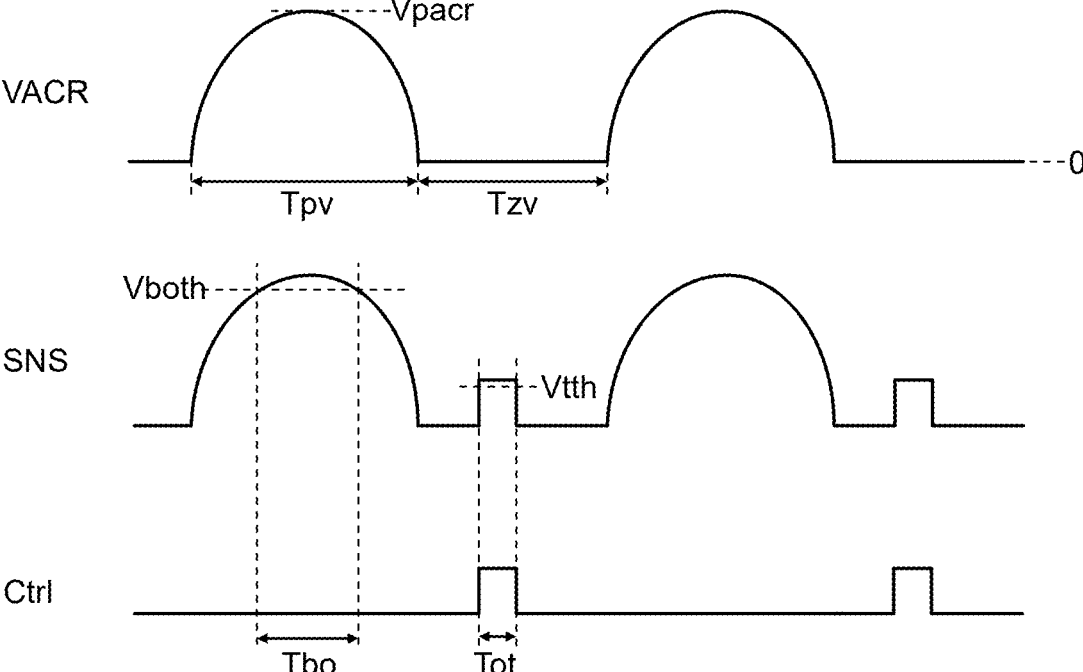
FIG. 5 shows an operational waveform diagram of the power conversion system corresponding to FIG. 4 according to an embodiment of the present invention.

Please refer to both FIGS. 4 and 5. FIG. 5 shows an operational waveform diagram of the power conversion system corresponding to FIG. 4 according to an embodiment of the present invention. In one embodiment, as shown in FIG. 5, the rectified voltage VACR shows a waveform of the AC input voltage VAC after half-wave rectification. In this embodiment, an over-temperature protection period Tot is related to a zero-voltage period Tzv of the rectified voltage VACR, and a brown-out protection period Tbo is related to a positive voltage period Tpv of the rectified voltage VACR. During the brown-out protection period Tbo, the rectified voltage VACR has a peak voltage Vpacr. In a specific embodiment, during the over-temperature protection period Tot shown in FIG. 5, the bias switch SWB is conductive according to the control signal Ctrl, thereby the multiplexed sensing signal SNS generating a pulse wave, wherein the high level of the pulse wave is related to the bias current IB, the resistance value of the temperature-sensitive element RT, and the temperature coefficient of the temperature-sensitive element RT. In this embodiment, during the over-temperature protection period Tot, the multiplexed sensing signal SNS (corresponding to the temperature sensing signal VTS) does not fall below the temperature sensing threshold Vtth, such that the over-temperature protection signal Votp indicates that the tested temperature is not above the predetermined temperature threshold.

In one specific embodiment, during the brown-out protection period Tbo shown in FIG. 5, the multiplexed sensing signal SNS (corresponding to the input voltage sensing signal VIS) is not below the brown-out sensing threshold Vboth, thereby the brown-out protection signal Vbo indicating that the AC input voltage VAC is not below the predetermined brown-out threshold. It should be noted that, in one embodiment, outside the over-temperature protection period Tot, the control signal Ctrl may control the bias switch SWB to be non-conductive.

Figure 6:
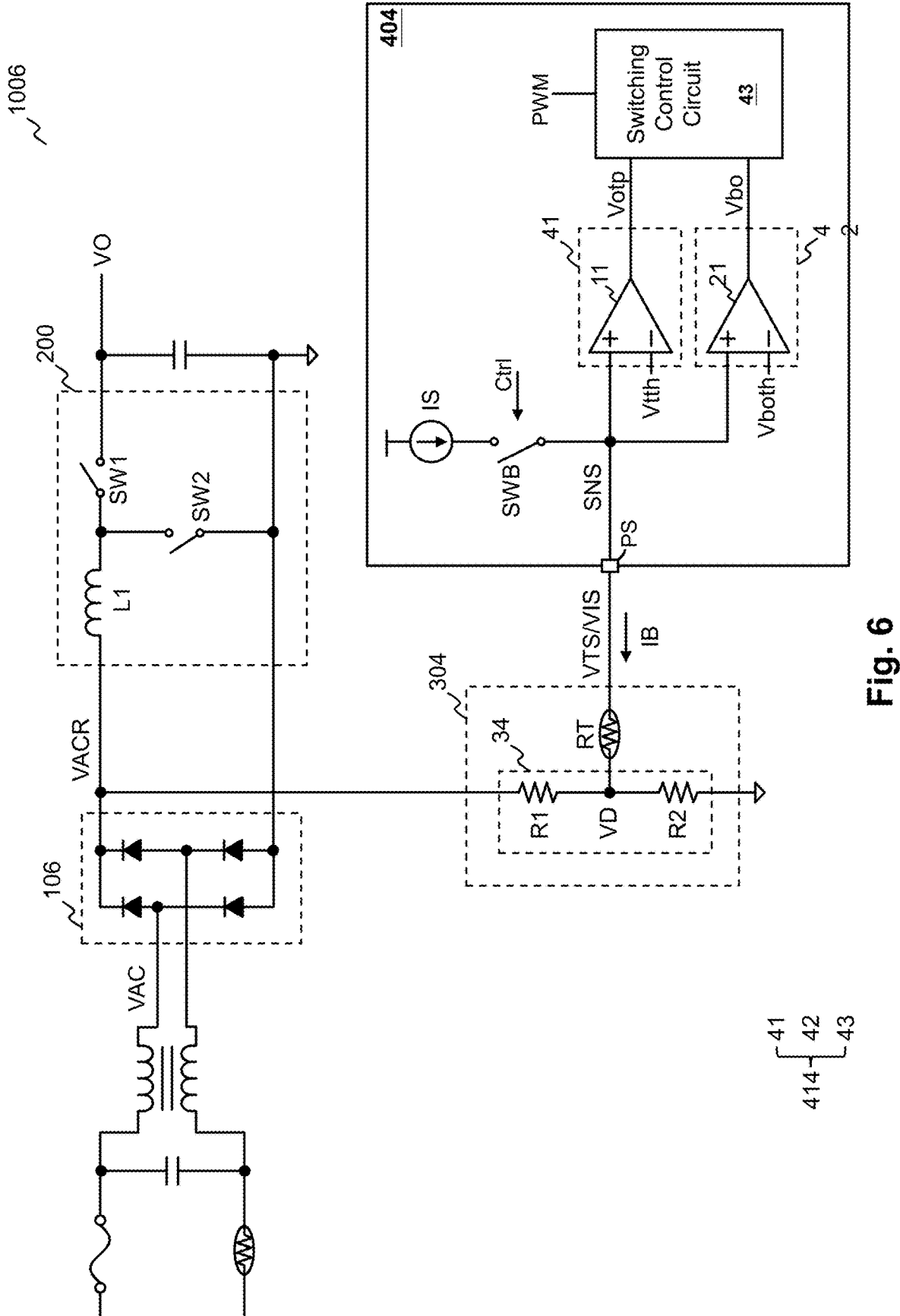
FIG. 6 shows a schematic diagram of the power conversion system according to a specific embodiment of the present invention.

FIG. 6 shows a schematic diagram of the power conversion system according to a specific embodiment of the present invention. The power conversion system 1006 in FIG. 6 is similar to the power conversion system 1004 in FIG. 4, with the difference being that the rectifier 106 in FIG. 6 is configured as a full-wave rectifier, including four diodes, for full-wave rectifying the AC input voltage VAC to generate the rectified voltage VACR. Other circuit details in FIG. 6 can be deduced from the description of FIG. 4 and will not be repeated here.

It should be noted that compared to prior art, the power conversion system of the present invention can perform both over-temperature protection operation and brown-out protection operation during different periods through the multiplex pin. Additionally, the power conversion system of the present invention does not require diodes, thereby improving the accuracy of temperature detection, which in turn enhances the accuracy of over-temperature and brown-out protection operations, avoiding the non-ideal effects caused by diodes.

Figure 7:
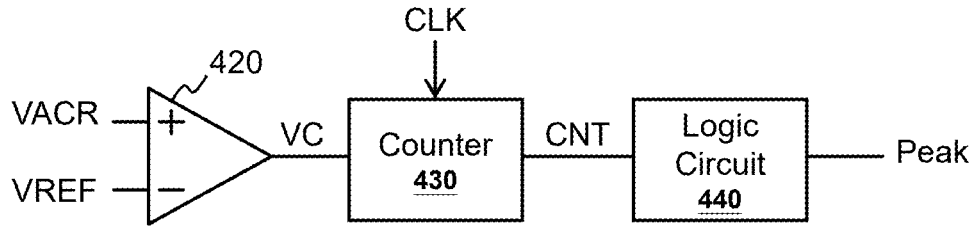
FIG. 7 shows a schematic diagram of a portion of the conversion control circuit according to an embodiment of the present invention.

FIG. 7 shows a schematic diagram of a portion of the conversion control circuit according to an embodiment of the present invention. In one embodiment, the conversion control circuit further includes a comparator 420, a counter 430, and a logic circuit 440. In one embodiment, the comparator 420 is configured to compare the rectified voltage VACR with the reference voltage VREF to generate a comparison result VC. The counter 430 is configured to count according to the comparison result VC and based on the clock signal CLK to generate a count signal CNT. Specifically, the counter 430 starts to count when the comparison result VC turns to the first level, and stops counting when the comparison result VC turns to the second level. In a specific embodiment, when the rectified voltage VACR is higher than the reference voltage VREF, the comparison result VC turns to the first level (e.g., high level); when the rectified voltage VACR is lower than the reference voltage VREF, the comparison result VC turns to the second level (e.g., low level). In one embodiment, the logic circuit 440 is configured to obtain the middle value of the count signal CNT based on the clock signal CLK when the comparison result VC is at the high level, to generate a peak signal Peak, thereby determining a peak time point tp when the rectified voltage VACR has a peak value.

Figure 8:
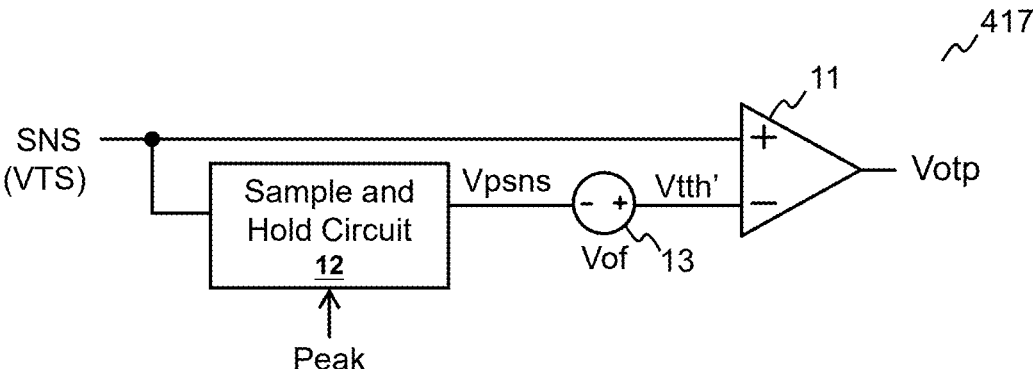
FIG. 8 shows a schematic diagram of a portion of the over-temperature protection circuit according to an embodiment of the present invention.

FIG. 8 shows a schematic diagram of a portion of the over-temperature protection circuit according to an embodiment of the present invention. In one embodiment, the over-temperature protection circuit 417 further includes a sample and hold circuit 12 and a bias generator 13. In one embodiment, the sample and hold circuit 12 samples and holds a peak voltage Vpsns of the multiplexed sensing signal SNS according to the peak signal Peak. In this embodiment, a temperature sensing threshold Vtth' is generated based on the peak voltage Vpsns through the bias generator 13. It should be noted that in this embodiment, the temperature sensing threshold Vtth' corresponds to a superposition of the peak voltage Vpsns and a bias voltage Vof generated by the bias generator 13. In one embodiment, during the over-temperature protection period, the comparator 11 is configured to compare the multiplexed sensing signal SNS (corresponding to the temperature sensing signal VTS during this period) with the temperature sensing threshold Vtth' to generate the over-temperature protection signal Votp.

Figure 9A:
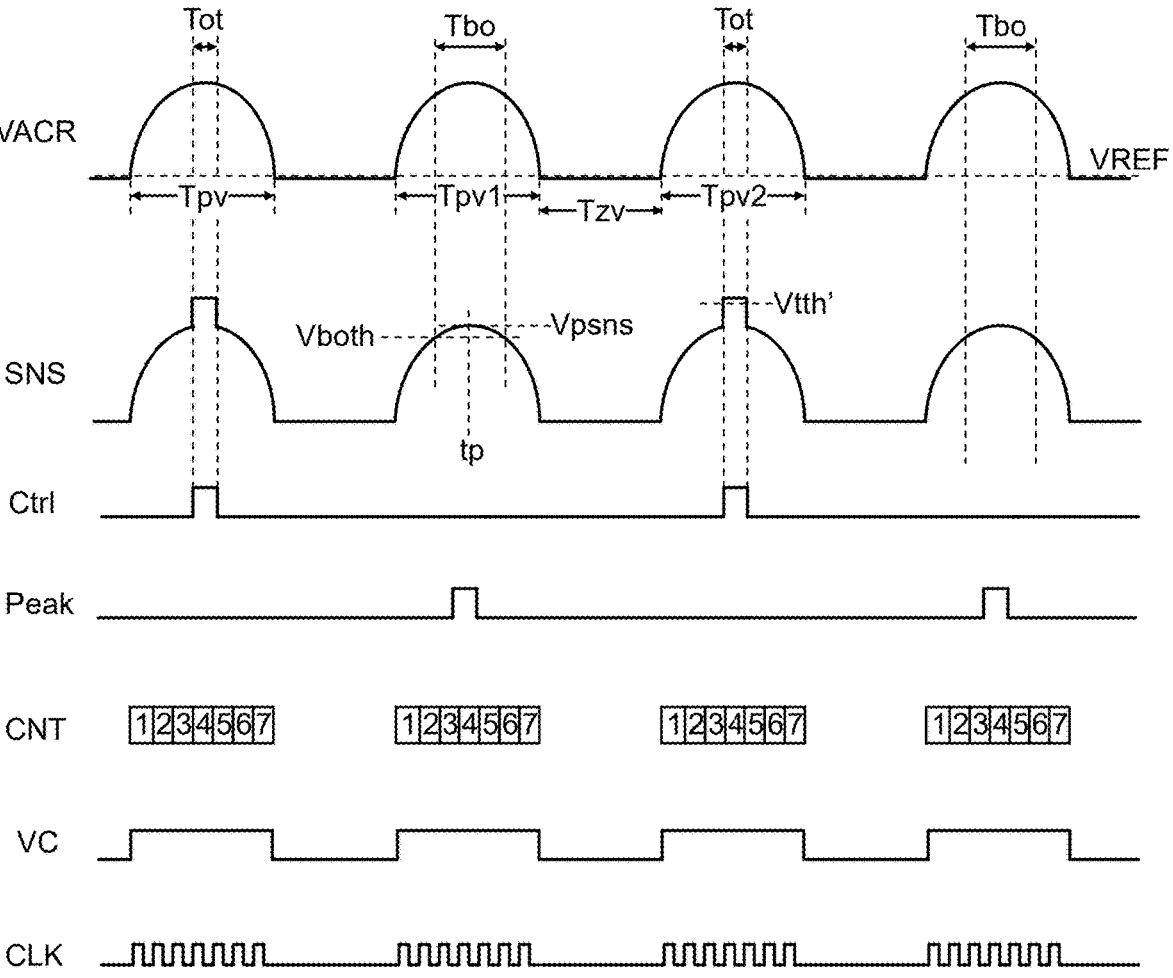
FIG. 9A shows an operational waveform diagram of the power conversion system corresponding to FIG. 4 according to an embodiment of the present invention.

Please refer to FIGS. 4, 7, and 9A. FIG. 9A shows an operational waveform diagram of the power conversion system corresponding to FIG. 4 according to an embodiment of the present invention. In this embodiment, as shown in FIG. 9A, both the over-temperature protection period Tot and the brown-out protection period Tbo are related to a positive voltage period Tpv of the rectified voltage VACR. In a specific embodiment, when the rectified voltage VACR is higher than the reference voltage VREF (e.g., zero), the comparison result VC turns to a high level, and conversely, the comparison result VC turns to a low level. When the comparison result VC is at a high level, the counter 430 counts based on the clock signal CLK to generate the count signal CNT, and when the comparison result VC is at a low level, the counter 430 stops counting, thereby determining the peak signal Peak and the peak time point tp. In a specific embodiment, during a positive voltage period Tpv1 of the rectified voltage VACR, when entering the brown-out protection period Tbo, it is determined whether to perform brown-out protection operation based on the comparison between the multiplexed sensing signal SNS and the brown-out sensing threshold Vboth, and during the same brown-out protection period Tbo, the peak voltage Vpsns of the multiplexed sensing signal SNS is sampled and held at the peak time point tp based on the peak signal Peak. During the next positive voltage period Tpv2 of the rectified voltage VACR, when entering the over-temperature protection period Tot, the control signal Ctrl controls the bias switch SWB to be conductive, and it is determined whether to perform the over-temperature protection operation based on the comparison between the multiplexed sensing signal SNS and the temperature sensing threshold Vtth'.

It should be noted that the brown-out protection period Tbo and the over-temperature protection period Tot are performed during the positive voltage periods Tpv of the rectified voltage VACR in different cycles, allowing the multiplex pin PS to perform different operations at different times. It should also be noted that when the over-temperature protection period Tot is related to a positive voltage period Tpv of the rectified voltage VACR, the temperature sensing threshold Vtth' includes the peak voltage Vpsns of the multiplexed sensing signal SNS (i.e., the peak value of the temperature sensing signal VTS).

Figure 9B:
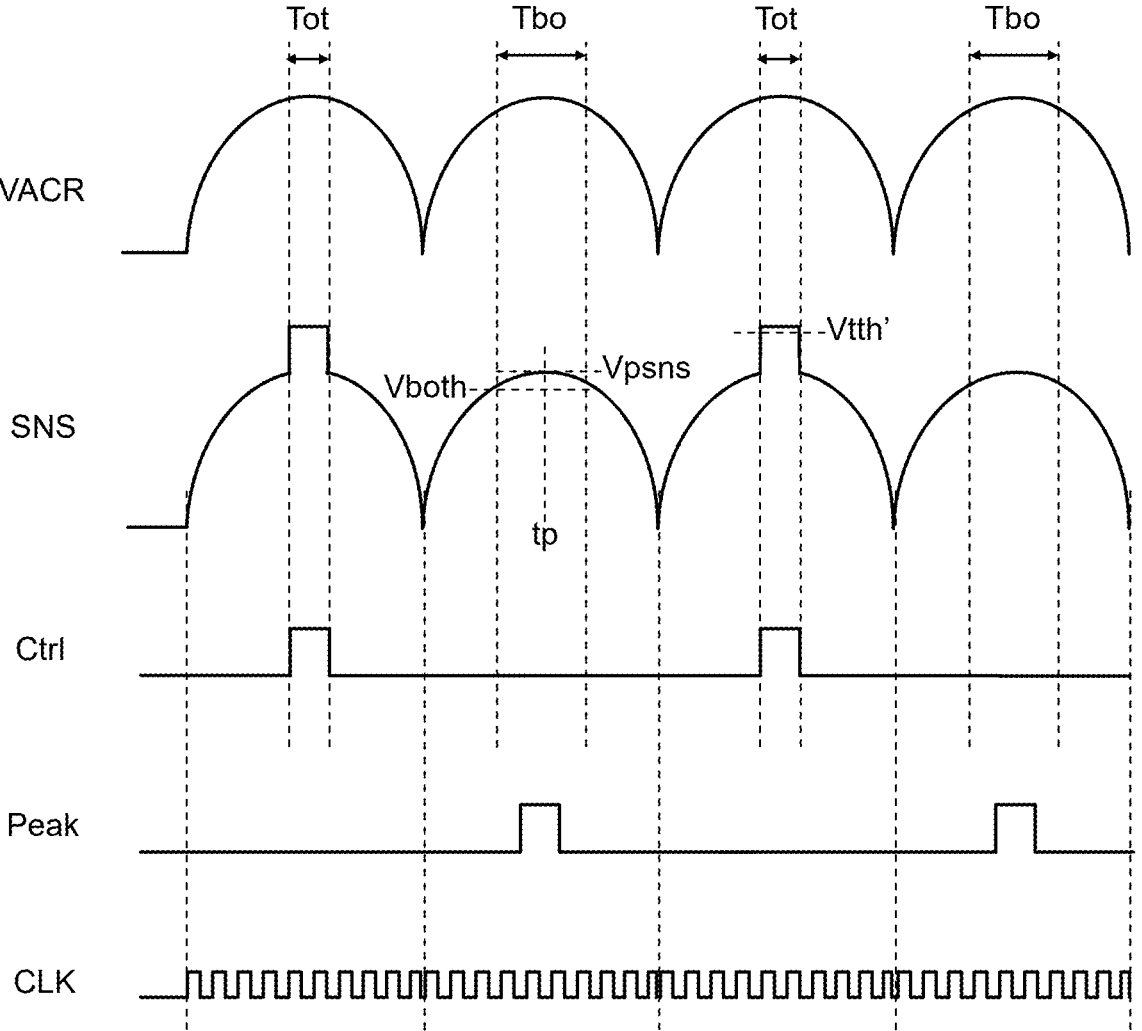
FIG. 9B shows an operational waveform diagram of the power conversion system corresponding to FIG. 6 according to an embodiment of the present invention.

FIG. 9B shows an operational waveform diagram of the power conversion system corresponding to FIG. 6 according to an embodiment of the present invention. In one embodiment, as shown in FIG. 9B, the rectified voltage VACR represents the waveform of the AC input voltage VAC after full-wave rectification. Compared to FIG. 9A, in the embodiment of FIG. 9B, since the rectified voltage VACR is the waveform of the AC input voltage VAC after full-wave rectification, there is no zero-voltage period Tzv of the AC input voltage VAC. Other waveform details of FIG. 9B can be deduced from the description of FIG. 9A.

Figure 10A:
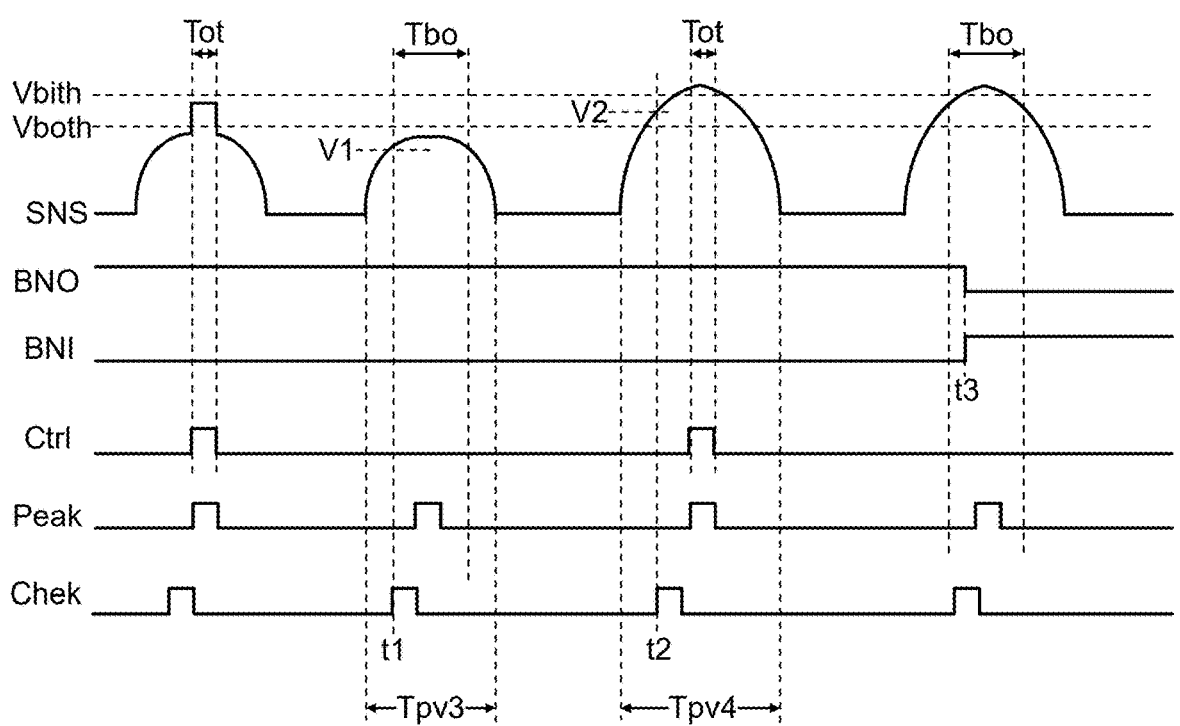
FIG. 10A shows an operational waveform diagram of the power conversion system corresponding to FIG. 4 according to an embodiment of the present invention.

Please refer to FIGS. 4 and 10A simultaneously. FIG. 10A shows an operational waveform diagram of the power conversion system corresponding to FIG. 4 according to an embodiment of the present invention. In one embodiment, outside the over-temperature protection period Tot, the conversion control circuit 404 is further configured for a brown-in control. When the multiplexed sensing signal SNS (corresponding to the input voltage sensing signal VIS) is higher than the brown-in sensing threshold Vbith, the conversion control circuit 404 indicates that the AC input voltage VAC is higher than a predetermined brown-in threshold. In one embodiment, the brown-in sensing threshold Vbith is higher than the brown-out sensing threshold Vboth, meaning the predetermined brown-in threshold is higher than the predetermined brown-out threshold. In a specific embodiment, at time point t3 in FIG. 10A, the multiplexed sensing signal SNS is higher than the brown-in sensing threshold Vbith. At this time point, the brown-out sensing signal BNO turns to a low level, and the brown-in sensing signal BNI turns to a high level, thereby initiating the brown-in control.

In one embodiment, according to the check signal Chek, the conversion control circuit 404 further samples and holds a first voltage value V1 of the multiplexed sensing signal SNS at a first determination time point t1 during a positive voltage period Tpv3 of the rectified voltage VACR, and samples and holds a second voltage value V2 of the multiplexed sensing signal SNS at a second determination time point t2 during another positive voltage period Tpv4 of the rectified voltage VACR. In one embodiment, the conversion control circuit 404 further determines whether to perform the over-temperature protection operation based on the difference between the first voltage value V1 and the second voltage value V2. In this embodiment, the difference between the first voltage value V1 and the second voltage value V2 is greater than a threshold, so the conversion control circuit 404 skips the over-temperature protection operation during the over-temperature protection period Tot in the positive voltage period Tpv4.

It should be noted that the phase corresponding to the first determination time point t1 relative to the positive voltage period Tpv3 has the same phase relationship as the phase corresponding to the second determination time point t2 relative to another positive voltage period Tpv4. The first determination time point t1 is related to the brown-out protection period Tbo, and the second determination time point t2 is related to the over-temperature protection period Tot. It should also be noted that in this embodiment, because the temperature sensing threshold Vtth' includes the peak voltage Vpsns of the multiplexed sensing signal SNS sampled and held during the positive voltage period Tpv3, when the difference between the first voltage value V1 and the second voltage value V2 is greater than a threshold, the temperature sensing threshold Vtth' becomes inaccurate, thus the over-temperature protection operation is skipped. Other waveform details of FIG. 10A can be deduced from the description of FIG. 9A.

Figure 10B:
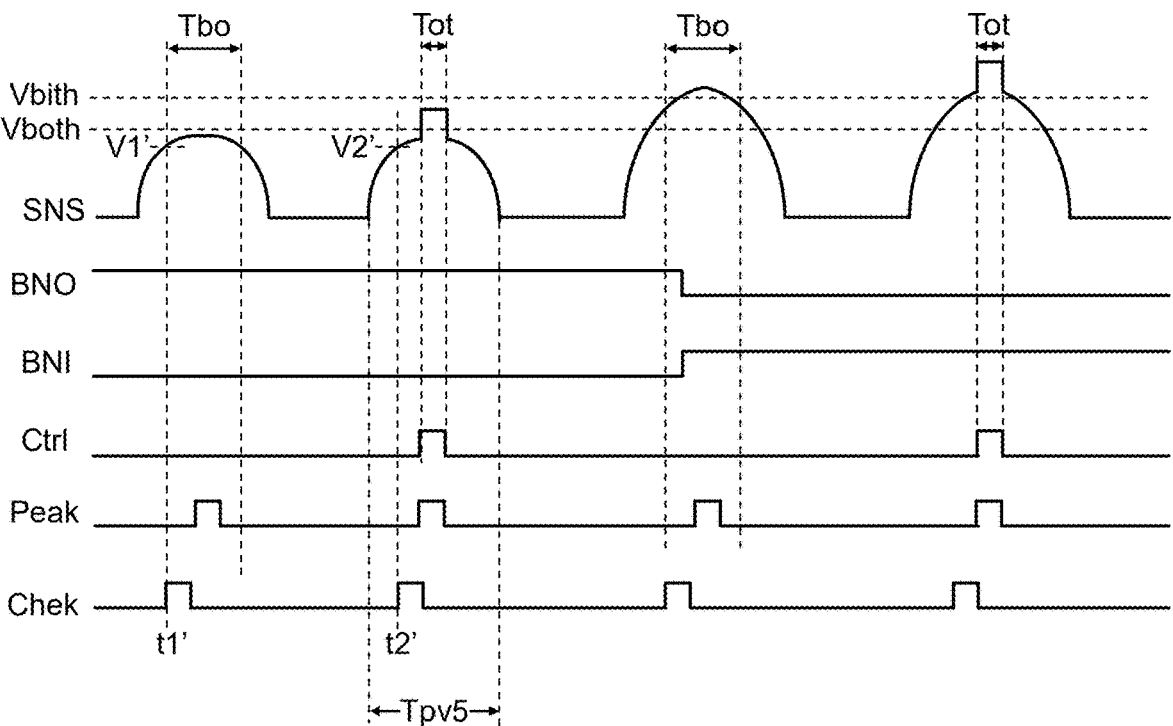
FIG. 10B shows an operational waveform diagram of the power conversion system corresponding to FIG. 4 according to an embodiment of the present invention.

Please refer to FIGS. 4 and 10B simultaneously. FIG. 10B shows an operational waveform diagram of the power conversion system corresponding to FIG. 4 according to an embodiment of the present invention. In one embodiment, according to the check signal Chek, a first voltage value V1' of the multiplexed sensing signal SNS is sampled and held at a first determination time point t1', and a second voltage value V2' of the multiplexed sensing signal SNS is sampled and held at a second determination time point t2'. In this embodiment, since the difference between the first voltage value V1' and the second voltage value V2' is less than a threshold, the conversion control circuit 404 performs the over-temperature protection operation during the over-temperature protection period Tot in a positive voltage period Tpv5. Other waveform details of FIG. 10B can be deduced from the description of FIG. 10A. It should be noted that FIGS. 10A and 10B do not show details such as the peak voltage Vpsns and the temperature sensing threshold Vtth', which can be deduced from FIG. 9A.

Figure 11:
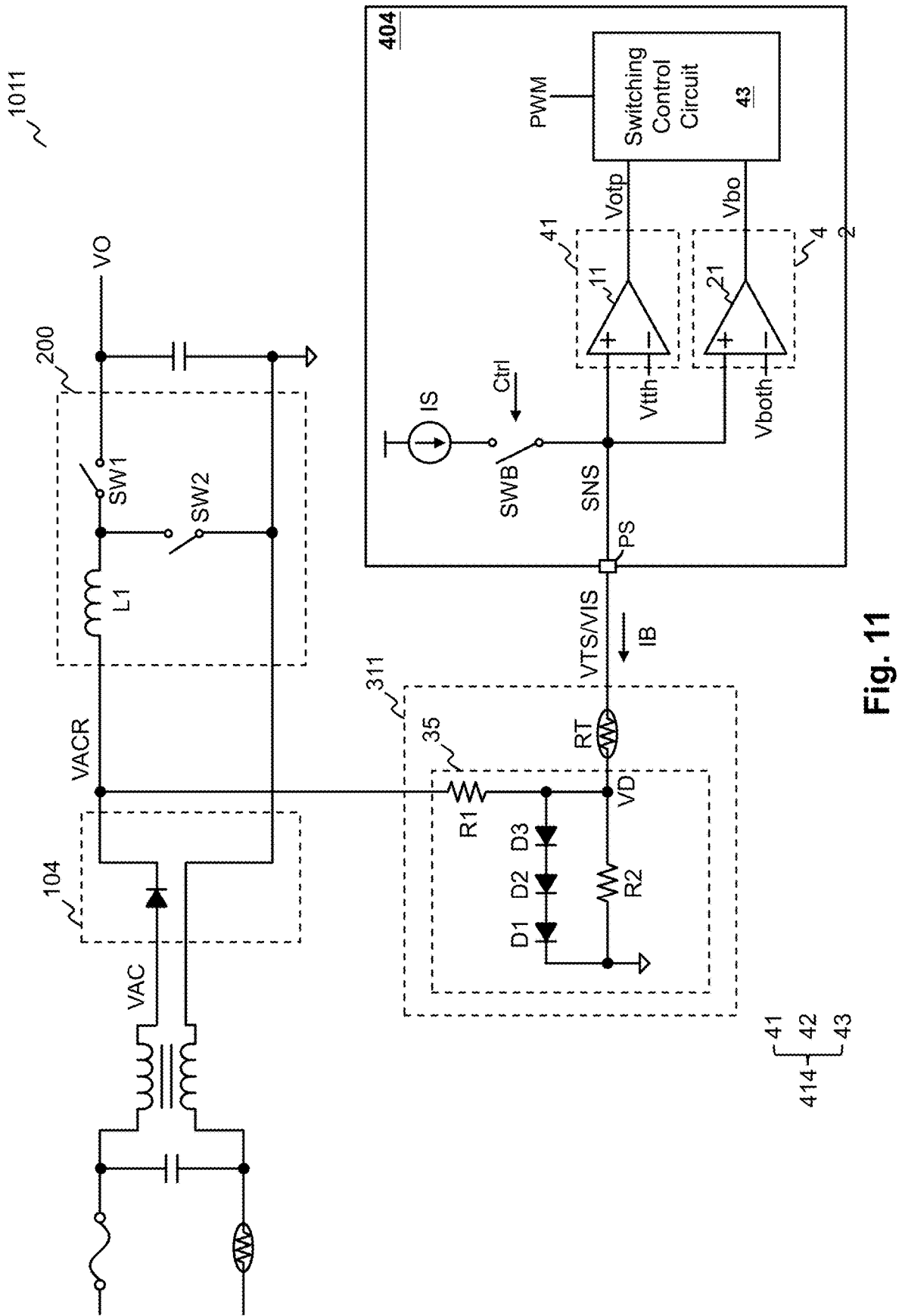
FIG. 11 shows a schematic diagram of the sensing circuit in the power conversion system according to an embodiment of the present invention.

FIG. 11 shows a schematic diagram of the sensing circuit in the power conversion system according to an embodiment of the present invention. Compared to the embodiment in FIG. 4, as shown in the power conversion system 1011 in FIG. 11, in one embodiment, a voltage divider 35 in the sensing circuit 311 further includes multiple diodes, which in this embodiment include diodes D1 to D3. In this embodiment, the resistor R1 is coupled between the AC input voltage VAC or the rectified voltage VACR and the temperature-sensitive element RT, the resistor R2 is coupled between the temperature-sensitive element RT and the ground potential, and diodes D1 to D3 are coupled in series between the temperature-sensitive element RT and the ground potential. In one embodiment, during the brown-out protection period, the divided voltage VD is less than the forward bias of diodes D1 to D3 in series; hence, the diodes D1 to D3 are non-conductive. In one embodiment, when the over-temperature protection period Tot is related to the zero-voltage period Tzv of the rectified voltage VACR, during the over-temperature protection period, the resistors R1 and R2, and the diodes D1 to D3 (being conductive) are electrically connected in parallel between the temperature-sensitive element RT and the ground potential. In this condition, the diodes D1 to D3 have a forward bias (e.g., about 2.1 volts), and the bias current IB flows through the temperature-sensitive element RT and the diodes D1 to D3, thereby generating the temperature sensing signal VTS. It should be noted that in this embodiment, according to the characteristics of the diodes, during the over-temperature protection period, the equivalent on-resistance of diodes D1 to D3 is much smaller than the equivalent resistance of the resistor R1, the resistor R2, or the temperature-sensitive element RT. Thus, when the tested temperature is close to but not exceeding the predetermined temperature threshold, the voltage across the temperature-sensitive element RT is not too low to affect the accuracy of t the over-temperature protection operation. For example, in one embodiment, the resistance of the resistor R1 is 17.9M ohms (MΩ), the resistance of the resistor R2 is 100 k ohms (kΩ), and the resistance of the temperature-sensitive element RT is 2.5 k ohms. For other details not mentioned in FIG. 11, please refer to the description of FIG. 4 above.

Figure 12:
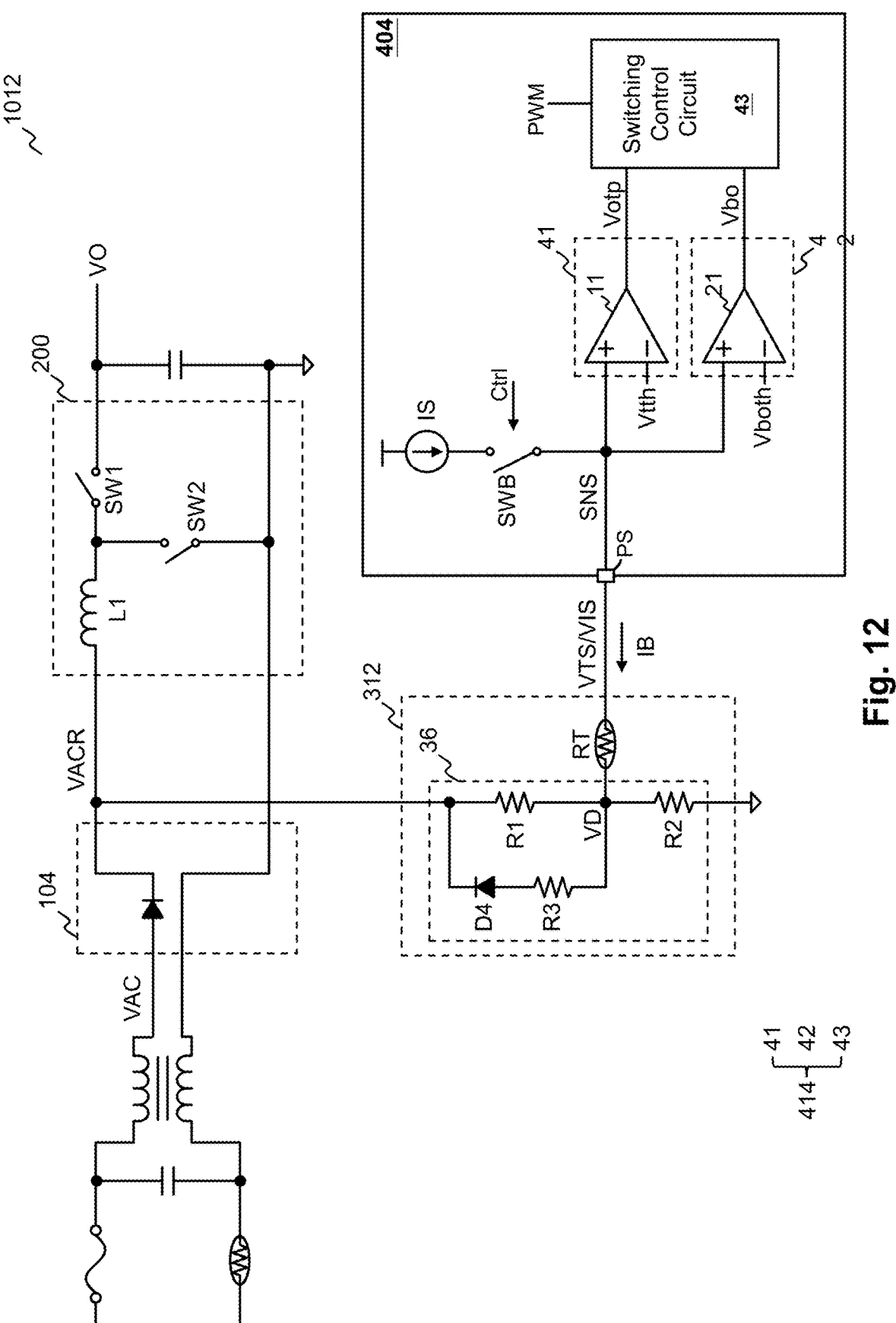
FIG. 12 shows a schematic diagram of the sensing circuit in the power conversion system according to an embodiment of the present invention.

FIG. 12 shows a schematic diagram of the sensing circuit in the power conversion system according to an embodiment of the present invention. Compared to the embodiment in FIG. 4, as shown in the power conversion system 1012 in FIG. 12, in one embodiment, the voltage divider 36 in the sensing circuit 312 further includes a diode D4 and a resistor R3. In this embodiment, the resistor R1 is coupled between the AC input voltage VAC or the rectified voltage VACR and the temperature-sensitive element RT, the resistor R2 is coupled between the temperature-sensitive element RT and the ground potential, and the diode D4 and the resistor R3 are coupled in parallel to the resistor R1. In one embodiment, during the brown-out protection period, the diode D4 is non-conductive. In one embodiment, when the over-temperature protection period Tot is related to the zero-voltage period Tzv of the rectified voltage VACR, during the over-temperature protection period, the resistors R1 and R2, and the series-connected diode D4 and resistor R3 are coupled in parallel between the temperature-sensitive element RT and the ground potential. The bias current IB flows through the temperature-sensitive element RT, the diode D4 and the resistor R3, thereby generating the temperature sensing signal VTS. In one embodiment, when the tested temperature is close to but not exceeding the predetermined temperature threshold, the difference between the resistance of the resistor R3 and the equivalent resistance of the temperature-sensitive element RT is small enough to ensure that the voltage across the temperature-sensitive element RT is large enough, thereby making the temperature measurement error smaller than a predetermined error range. In other words, the resistance of the resistor R3 is close to the equivalent resistance of the temperature-sensitive element RT, such that the voltage across the temperature-sensitive element RT is not too low to affect the accuracy of the over-temperature protection operation. For example, in one embodiment, the resistance of the resistor R1 is 17.9M ohms (MΩ), the resistance of the resistor R2 is 100 k ohms (kΩ), the resistance of the resistor R3 is 2 k ohms (kΩ), and the resistance of the temperature-sensitive element RT is 2.5 k ohms. For other details not mentioned in FIG. 12, please refer to the description of FIG. 4 above.

Please continue to refer to FIG. 12. In one embodiment, during a first period of the over-temperature protection period, the bias current IB has a first current value I1 to generate a first temperature sensing voltage Vts1 at the multiplex pin PS, and during a second period of the over-temperature protection period, the bias current IB has a second current value I2 to generate a second temperature sensing voltage Vts2 at the multiplex pin PS. In one embodiment, the voltage across the temperature-sensitive element RT is obtained according to the first current value I1, the first temperature sensing voltage Vts1, the second current value I2, and the second temperature sensing voltage Vts2, thereby achieving the over-temperature protection operation. Specifically, during an over-temperature protection period, assuming the temperature-sensitive element RT has a resistance value Rtcv, and the resistor R3 has a resistance value R3V, during the first period of the over-temperature protection period, the voltage across the diode D4 is VF1, and during the second period of the over-temperature protection period, the voltage across the diode D4 is VF2, and the following equations can be derived:

$$Vts1 = I1 * Rtcv + I1 * R3V + VF1 \qquad \text{(Eq. 1)}$$

$$Vts2 = I2 * Rtcv + I2 * R3V + VF2 \qquad \text{(Eq. 2)}$$

$$Vts2 - Vts1 = (I2 - I1) * Rtcv + (I2 - I1) * R3V + (VF2 - VF1) \qquad \text{(Eq. 3)}$$

In the above equation 3, assuming the voltage difference of the diode D4 (VF2−VF1) is a constant value Vos, the voltage across the temperature-sensitive element RT ((I2−I1)*Rtcv) can be obtained from the following equation 4:

$$(I2 - I1) * Rtcv = (Vts2 - Vts1) - (I2 - I1) * R3V - Vos \qquad \text{(Eq. 4)}$$

It should be noted that in the above embodiment, during the first period and the second period of the over-temperature protection period, two temperature sensing voltages are generated at the multiplex pin PS through the two current values of the bias current IB, and then the voltage across the temperature-sensitive element RT is obtained from the difference between the two temperature sensing voltages. As shown in equation 4, the advantage of this method is that the voltage difference of the diode D4 corresponding to the two current values (e.g., approximately the Vos with small variations) is smaller than the voltage difference of the diode at different temperatures. Therefore, the temperature coefficient of the diode can still be effectively compensated for, meaning the effect of temperature on the diode can be mitigated. This improves the accuracy of temperature sensing and, consequently, enhances the accuracy of the over-temperature protection operation.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be configured together, or, a portion of one embodiment can be configured to replace a corresponding part of another embodiment. In view of the foregoing, the spirit of the present invention should cover all such and other modifications and variations, which should be interpreted to fall within the scope of the following claims and their equivalents.

What is claimed is:

1. A power conversion system, configured to convert an AC input voltage into an output voltage, comprising:

a rectifier, configured to rectify the AC input voltage to generate a rectified voltage;

a power stage circuit, coupled to the rectifier, including at least one switch and an inductor;

a sensing circuit, including a temperature-sensitive element, wherein the sensing circuit is coupled to the AC input voltage or the rectified voltage and configured to generate a multiplexed sensing signal; and a conversion control circuit, configured to perform an over temperature protection (OTP) operation during an over temperature protection period and to perform a brown-out protection operation during a brown-out protection period, based on the status of the multiplexed sensing signal, wherein the conversion control circuit includes:

a multiplex pin, coupled to the multiplexed sensing signal, wherein the multiplexed sensing signal corresponds to a temperature sensing signal during the over temperature protection period and corresponds to an input voltage sensing signal outside the over temperature protection period; and a current source and a bias switch, serially coupled to the multiplex pin;

wherein during the over temperature protection period, the bias switch is conductive to control the current source to provide a bias current to the sensing circuit through the multiplex pin, thereby the sensing circuit generating the temperature sensing signal at the multiplex pin, and when the temperature sensing signal exceeds a temperature sensing threshold, the conversion control circuit indicates that a tested temperature is above a predetermined temperature threshold;

wherein outside the over temperature protection period, the bias switch is non-conductive to stop the provision of the bias current through the multiplex pin, thereby the sensing circuit generating the input voltage sensing signal at the multiplex pin;

wherein during the brown-out protection period, when the input voltage sensing signal is below a brown-out sensing threshold, the conversion control circuit indicates that the AC input voltage is below a predetermined brown-out threshold.

2. The power conversion system of claim 1, wherein the sensing circuit further includes a voltage divider, configured to generate a divided voltage based on the AC input voltage or the rectified voltage;

wherein the temperature-sensitive element is coupled between the divided voltage and the multiplex pin to generate the multiplexed sensing signal at the multiplex pin;

wherein during the over temperature protection period, the bias current flows through the temperature-sensitive element and the voltage divider to generate the temperature sensing signal;

wherein outside the over temperature protection period, the divided voltage of the voltage divider corresponds to the input voltage sensing signal.

3. The power conversion system of claim 2, wherein the rectifier is configured as a half-wave rectifier to half-wave rectify the AC input voltage to generate the rectified voltage; wherein the over temperature protection period is related to a zero-voltage period of the rectified voltage, during which the rectified voltage is zero.

4. The power conversion system of claim 3, wherein the brown-out protection period is related to a positive voltage period of the rectified voltage, during which the rectified voltage is greater than zero, and during the brown-out protection period, the rectified voltage has a peak voltage.

5. The power conversion system of claim 3, wherein the voltage divider includes:

a first resistor, coupled between the AC input voltage or the rectified voltage and the temperature-sensitive element;

a second resistor, coupled between the temperature-sensitive element and a ground potential; and a plurality of diodes, serially coupled between the temperature-sensitive element and the ground potential;

wherein the over temperature protection period corresponds to the zero-voltage period of the rectified voltage;

wherein during the over temperature protection period, the bias current flows through the temperature-sensitive element and the plurality of diodes to generate the temperature sensing signal, wherein an equivalent resistance of the plurality of diodes when conductive is much smaller than an equivalent resistance of the first resistor, the second resistor, or the temperature-sensitive element;

wherein during the brown-out protection period, the plurality of diodes are non-conductive.

6. The power conversion system of claim 3, wherein the voltage divider includes:

a first resistor, coupled between the AC input voltage or the rectified voltage and the temperature-sensitive element;

a second resistor, coupled between the temperature-sensitive element and a ground potential; and a diode and a third resistor, coupled in parallel to the first resistor;

wherein the over temperature protection period corresponds to the zero-voltage period of the rectified voltage;

wherein during the over temperature protection period, the bias current flows through the temperature-sensitive element and the diode and the third resistor to generate the temperature sensing signal, wherein when the tested temperature is close to but not exceeding the predetermined temperature threshold, a difference between a resistance value of the third resistor and an equivalent resistance value of the temperature-sensitive element is small enough to ensure that a voltage across the temperature-sensitive element is large enough, such that a temperature measurement error is less than a predetermined error range;

wherein during the brown-out protection period, the diode is non-conductive.

7. The power conversion system of claim 6, wherein during a first period of the over temperature protection period, the bias current has a first current value, thereby generating a first temperature sensing voltage at the multiplex pin, and during a second period of the over temperature protection period, the bias current has a second current value, thereby generating a second temperature sensing voltage at the multiplex pin; wherein a voltage across the temperature-sensitive element is obtained with a voltage offset of the diode being eliminated, based on the first current value, the first temperature sensing voltage, the second current value, and the second temperature sensing voltage, thereby achieving the over temperature protection operation.

8. The power conversion system of claim 1, wherein the rectifier is configured as a half-wave rectifier or a full-wave rectifier to half-wave rectify or full-wave rectify the AC input voltage to generate the rectified voltage;

wherein the conversion control circuit further samples and holds a peak value of the multiplexed sensing signal at a peak time point during the brown-out protection period.

9. The power conversion system of claim 8, wherein the conversion control circuit further samples and holds a first voltage value of the multiplexed sensing signal at a first determination time point during a positive voltage period of the rectified voltage, during which the rectified voltage is greater than zero, and samples and holds a second voltage value of the multiplexed sensing signal at a second determination time point during another positive voltage period of the rectified voltage, wherein a phase corresponding to the first determination time point relative to the positive voltage period has the same phase relationship as a phase corresponding to the second determination time point relative to the another positive voltage period;

wherein when a difference between the first voltage value and the second voltage value is less than a threshold, the over temperature protection operation is performed during the over temperature protection period, and when the difference between the first voltage value and the second voltage value is greater than the threshold, the over temperature protection operation is skipped during the over temperature protection period;

wherein the first determination time point is related to the brown-out protection period, and the second determination time point is related to the over temperature protection period.

10. The power conversion system of claim 8, wherein the temperature sensing threshold includes a peak value of the temperature sensing signal.

11. The power conversion system of claim 8, wherein the conversion control circuit further includes:

a comparator, configured to compare the AC input voltage or the rectified voltage with a reference voltage to generate a comparison result; and a counter, configured to count according to the comparison result, starting to count when the comparison result turns to a first level, and stopping counting when the comparison result turns to a second level, thereby determining the peak time point during the brown-out protection period.

12. The power conversion system of claim 1, wherein outside the over temperature protection period, the conversion control circuit is further configured to perform a brown-in control, wherein when the input voltage sensing signal is above a brown-in sensing threshold, the conversion control circuit indicates that the AC input voltage is above a predetermined brown-in threshold, wherein the brown-in sensing threshold is higher than the brown-out sensing threshold.

13. A conversion control circuit for controlling a power conversion system, wherein the power conversion system is configured to convert an AC input voltage into an output voltage, wherein the power conversion system includes a rectifier, a power stage circuit, and a sensing circuit, wherein the rectifier is configured to rectify the AC input voltage to generate a rectified voltage, wherein the power stage circuit is coupled to the rectifier and includes at least one switch and an inductor, wherein the sensing circuit includes a temperature-sensitive element, and is coupled to the AC input voltage or the rectified voltage to generate a multiplexed sensing signal; the conversion control circuit being configured to perform an over temperature protection (OTP) operation during an over temperature protection and to perform a brown-out protection operation during a brown-out protection period, based on the status of the multiplexed sensing signal, wherein the conversion control circuit comprises:

a multiplex pin, coupled to the multiplexed sensing signal, wherein the multiplexed sensing signal corresponds to a temperature sensing signal during the over temperature protection period, and corresponds to an input voltage sensing signal outside the over temperature protection period; and a current source and a bias switch, serially coupled to the multiplex pin;

wherein during the over temperature protection period, the bias switch is conductive to control the current source to provide a bias current to the sensing circuit through the multiplex pin, thereby the sensing circuit generating the temperature sensing signal at the multiplex pin, and when the temperature sensing signal exceeds a temperature sensing threshold, the conversion control circuit indicates that a tested temperature is above a predetermined temperature threshold;

wherein outside the over temperature protection period, the bias switch is non-conductive to stop the provision of the bias current through the multiplex pin, thereby the sensing circuit generating the input voltage sensing signal at the multiplex pin;

wherein during the brown-out protection period, when the input voltage sensing signal is below a brown-out sensing threshold, the conversion control circuit indicates that the AC input voltage is below a predetermined brown-out threshold.

14. The conversion control circuit of claim 13, wherein the rectifier is configured as a half-wave rectifier to half-wave rectify the AC input voltage to generate the rectified voltage; wherein the over temperature protection period is related to a zero-voltage period of the rectified voltage, during which the rectified voltage is zero.

15. The conversion control circuit of claim 14, wherein the brown-out protection period is related to a positive voltage period of the rectified voltage, during which the rectified voltage is greater than zero, and during the brown-out protection period, the rectified voltage has a peak voltage.

16. The conversion control circuit of claim 13, wherein the rectifier is configured as a half-wave rectifier or a full-wave rectifier to half-wave rectify or full-wave rectify the AC input voltage to generate the rectified voltage;

wherein the conversion control circuit further samples and holds a peak value of the multiplexed sensing signal at a peak time point during the brown-out protection period.

17. The conversion control circuit of claim 16, further samples and holds a first voltage value of the multiplexed sensing signal at a first determination time point during a positive voltage period of the rectified voltage, during which the rectified voltage is greater than zero, and samples and holds a second voltage value of the multiplexed sensing signal at a second determination time point during another positive voltage period of the rectified voltage, wherein a phase corresponding to the first determination time point relative to the positive voltage period has the same phase relationship as a phase corresponding to the second determination time point relative to the another positive voltage period;

wherein when a difference between the first voltage value and the second voltage value is less than a threshold, the over temperature protection operation is performed during the over temperature protection period, and when the difference between the first voltage value and the second voltage value is greater than the threshold, the over temperature protection operation is skipped during the over temperature protection period;

wherein the first determination time point is related to the brown-out protection period, and the second determination time point is related to the over temperature protection period.

18. The conversion control circuit of claim 16, wherein the temperature sensing threshold includes a peak value of the temperature sensing signal.

19. The conversion control circuit of claim 16, further comprising:

a comparator, configured to compare the AC input voltage or the rectified voltage with a reference voltage to generate a comparison result; and a counter, configured to count according to the comparison result, starting to count when the comparison result turns to a first level, and stopping counting when the comparison result turns to a second level, thereby determining the peak time point during the brown-out protection period.

20. The conversion control circuit of claim 13, wherein outside the over temperature protection period, further configured to perform a brown-in control, wherein when the input voltage sensing signal is above a brown-in sensing threshold, indicating that the AC input voltage is above a predetermined brown-in threshold, wherein the predetermined brown-in threshold is higher than the predetermined brown-out threshold.

21. A control method for controlling a power conversion system, wherein the power conversion system is configured to convert an AC input voltage into an output voltage, wherein the power conversion system includes a rectifier, a power stage circuit, and a sensing circuit, wherein the rectifier is configured to rectify the AC input voltage to generate a rectified voltage, wherein the power stage circuit is coupled to the rectifier and includes at least one switch and an inductor, wherein the sensing circuit includes a temperature-sensitive element and is coupled to the AC input voltage or the rectified voltage to generate a multiplexed sensing signal; the control method comprising:

controlling the power conversion system to perform an over temperature protection (OTP) operation during an over temperature protection period and to perform a brown-out protection operation during a brown-out protection period, based on the status of the multiplexed sensing signal;

receiving the multiplexed sensing signal at a multiplex pin of a conversion control circuit configured to control the power conversion system, wherein the multiplexed sensing signal corresponds to a temperature sensing signal during the over temperature protection period, and corresponds to an input voltage sensing signal outside the over temperature protection period;

providing a bias current to the sensing circuit through the multiplex pin during the over temperature protection period, thereby generating the temperature sensing signal at the multiplex pin, wherein when the temperature sensing signal exceeds a temperature sensing threshold, indicating that a tested temperature is above a predetermined temperature threshold;

stopping the provision of the bias current through the multiplex pin outside the over temperature protection period, thereby generating the input voltage sensing signal at the multiplex pin; and during the brown-out protection period, when the input voltage sensing signal is below a brown-out sensing threshold, the conversion control circuit indicates that the AC input voltage is below a predetermined brown-out threshold.

22. The control method of claim 21, wherein the rectifier is configured as a half-wave rectifier to half-wave rectify the AC input voltage to generate the rectified voltage; wherein the over temperature protection period is related to a zero-voltage period of the rectified voltage, during which the rectified voltage is zero.

23. The control method of claim 22, wherein the brown-out protection period is related to a positive voltage period of the rectified voltage, during which the rectified voltage is greater than zero, and during the brown-out protection period, the rectified voltage has a peak voltage.

24. The control method of claim 21, wherein the rectifier is configured as a half-wave rectifier or a full-wave rectifier to half-wave rectify or full-wave rectify the AC input voltage to generate the rectified voltage;

wherein the control method further comprises: sampling and holding a peak value of the multiplexed sensing signal at a peak time point during the brown-out protection period.

25. The control method of claim 24, further comprising: sampling and holding a first voltage value of the multiplexed sensing signal at a first determination time point during a positive voltage period of the rectified voltage, during which the rectified voltage is greater than zero, and sampling and holding a second voltage value of the multiplexed sensing signal at a second determination time point during another positive voltage period of the rectified voltage; and when a difference between the first voltage value and the second voltage value is less than a threshold, performing the over temperature protection operation during the over temperature protection period, and when the difference between the first voltage value and the second voltage value is greater than the threshold, skipping the over temperature protection operation during the over temperature protection period;

wherein a phase corresponding to the first determination time point relative to the positive voltage period has the same phase relationship as a phase corresponding to the second determination time point relative to the another positive voltage period, wherein the first determination time point is related to the brown-out protection period, and the second determination time point is related to the over temperature protection period.

26. The control method of claim 24, wherein the temperature sensing threshold includes a peak value of the temperature sensing signal.

27. The control method of claim 24, further comprising: comparing the AC input voltage or the rectified voltage with a reference voltage to generate a comparison result; and counting according to the comparison result, starting to count when the comparison result turns to a first level, and stopping counting when the comparison result turns to a second level, thereby determining the peak time point during the brown-out protection period.

28. The control method of claim 21, further comprising: performing a brown-in control outside the over temperature protection period, wherein when the input voltage sensing signal is above a brown-in sensing threshold, indicating that the AC input voltage is above a predetermined brown-in threshold, wherein the predetermined brown-in threshold is higher than the predetermined brown-out threshold.

* * * * *